US012689199B2

(12) United States Patent
Hawkinson et al.

(10) Patent No.: US 12,689,199 B2
(45) Date of Patent: Jul. 21, 2026

(54) POP-IN OLD WORK ELECTRICAL BOX

(71) Applicant: ABB Schweiz AG, Baden (CH)

(72) Inventors: William Hawkinson, Germantown, TN (US); Keith Lang, White House, TN (US); Derrick Meyers, Memphis, TN (US)

( * ) Notice: Subject to any disclaimer, the term of this patent is extended or adjusted under 35 U.S.C. 154(b) by 197 days.

(21) Appl. No.: 18/304,151

(22) Filed: Apr. 20, 2023

(65) Prior Publication Data

US 2024/0356320 A1 Oct. 24, 2024

(51) Int. Cl.
H02G 3/12 (2006.01)

(52) U.S. Cl.
CPC .................................. H02G 3/121 (2013.01)

(58) Field of Classification Search
CPC .......... H02G 3/08; H02G 3/081; H02G 3/083; H02G 3/12; H02G 3/121; H02G 3/126; H02G 3/125; H02G 3/10; H05K 5/00; H05K 5/02; H05K 5/0204; H05K 5/0217
USPC .. 174/480, 481, 50, 53, 57, 58, 535, 54, 61, 174/63; 220/3.2–3.9, 4.02; 248/906, 343
See application file for complete search history.

(56) References Cited

U.S. PATENT DOCUMENTS

| | | | | | |
|---|---|---|---|---|---|
| 2,769,562 | A | * | 11/1956 | Rudolph | H02G 3/123 |
| | | | | | 220/3.6 |
| 2,842,281 | A | * | 7/1958 | Chisholm | H02G 3/123 |
| | | | | | 220/3.6 |
| 3,659,037 | A | * | 4/1972 | MacDonald | H02G 3/123 |
| | | | | | 174/58 |
| 3,710,972 | A | * | 1/1973 | Barry | H02G 3/123 |
| | | | | | 220/3.6 |
| 3,848,764 | A | * | 11/1974 | Salg | H02G 3/123 |
| | | | | | 174/57 |
| 3,891,113 | A | * | 6/1975 | Salg | H02G 3/123 |
| | | | | | 220/3.6 |
| 4,063,660 | A | * | 12/1977 | Ware | H02G 3/123 |
| | | | | | 174/58 |
| 4,215,787 | A | * | 8/1980 | Moran, Jr. | H02G 3/14 |
| | | | | | 220/3.6 |
| 4,226,393 | A | * | 10/1980 | Rardin | H02B 1/044 |
| | | | | | 220/3.9 |
| 4,332,330 | A | * | 6/1982 | Lockwood | H02G 3/123 |
| | | | | | 220/3.6 |
| 5,257,946 | A | * | 11/1993 | MacMillan | H02G 3/14 |
| | | | | | 174/53 |
| 5,550,322 | A | * | 8/1996 | Tynan | H02G 3/123 |
| | | | | | 220/3.6 |
| 5,571,993 | A | * | 11/1996 | Jones | H02G 3/185 |
| | | | | | 220/3.7 |
| 6,170,685 | B1 | * | 1/2001 | Currier | H02G 3/121 |
| | | | | | 220/6 |
| 7,170,003 | B2 | * | 1/2007 | Fields | H02G 3/123 |
| | | | | | 174/53 |
| 7,173,194 | B2 | * | 2/2007 | Rupert | H02G 3/185 |
| | | | | | 220/3.6 |

(Continued)

*Primary Examiner* — Angel R Estrada
(74) *Attorney, Agent, or Firm* — McCarter & English, LLP; Michael M. Gnibus

(57) ABSTRACT

An electrical box having a housing having a closed end, and opposing first sidewalls, and opposing second sidewalls, the opposing first and second sidewalls extending from the closed end; and at least one wall engagement member provided on each of the opposing first sidewalls to engage an inner surface of a wall upon insertion of the housing into an opening along the wall.

26 Claims, 15 Drawing Sheets

(56) References Cited

U.S. PATENT DOCUMENTS

| | | | | |
|---|---|---|---|---|
| 7,586,039 B1 * | 9/2009 | Gretz | .................... | H02G 3/123 |
| | | | | 174/53 |
| 8,575,483 B2 * | 11/2013 | Gauthier | ................ | H02G 3/121 |
| | | | | 174/53 |
| 9,819,167 B2 * | 11/2017 | Kummer | ................... | H02G 3/14 |
| 11,223,189 B2 * | 1/2022 | Lee | ........................ | H02G 3/081 |

* cited by examiner

POP-IN OLD WORK ELECTRICAL BOX

BACKGROUND

The field of the disclosure relates generally to electrical boxes, and more particularity, to pop-in old work electrical boxes.

Electrical boxes, that are used in home construction are typically mounted to the sides of studs to provide the required stability to the electrical box and are installed before drywall/wall coverings. The electrical boxes are anchored to the studs using nails or fasteners. Alternatively, the electrical boxes may be anchored to the studs using screws in combination with an adjustable bracket.

Through normal wear-and-tear, electrical boxes may require replacement after drywall has been installed. In some instances, a homeowner may desire to relocate or add a new electrical box after drywall has been installed. However, removing drywall to install new electrical boxes is costly, time-consuming and requires repainting of the replaced drywall. "Old work" electrical boxes are configured to be installed into drywall, thus eliminating the need to replace drywall for installing an electrical box.

Known old work electrical boxes include movable wings that are positioned behind the drywall when the electrical box is located in the drywall opening. Screws are then rotated and the rotation causes the wings to be moved behind the drywall toward the drywall surface. The screws are rotated until the wings are moved into contact with the interior surface of the drywall, thereby urging the electrical box against the drywall. The old work electrical boxes, although effective do not anchor the electrical boxes to the drywall as securely as traditional electrical box-to stud anchoring methods and systems. Additionally, the wings may be over-torqued which may cause damage to the drywall or may damage and break off the wings, diminishing the integrity and stability of the anchoring connection between the old work electrical box and the drywall. Known old work electrical boxes may also have to be reinforced by driving multiple fasteners at an angle through sidewalls of the old work electrical box and studs, which may cause the sidewall to crack or break.

Furthermore, known old work electrical boxes consist of multiple parts which have to be assembled during manufacturing or assembled by the end user. By way of example, the wings and screws for rotating the wings must be assembled onto an injection-molded box. These multiple parts increase assembly time by the manufacturer or the end user. In addition, the added parts increase material costs and manufacturing time for the manufacturer.

Therefore there is a need for an improved old work electrical box which decreases manufacturing costs, simplifies or eliminates assembly, simplifies installation into drywall and improves securement to drywall.

BRIEF DESCRIPTION

In one aspect of the present disclosure, an electrical box is disclosed. The electrical box includes a housing having a closed end, opposing first sidewalls, and opposing second sidewalls, the opposing first and second sidewalls extending from the closed end; and at least one wall engagement member provided on each of the opposing first sidewalls to engage an inner surface of a wall upon insertion of the housing into an opening along the wall.

The at least one wall engagement member may include a planar barb member, a wedge-shaped barb or a barb having a stepped surface profile with a first ledge and a second ledge. The barb may also comprise a pivot tab. The barbs may be located different distances from electrical box tabs to accommodate different thickness walls where the electrical box is mounted.

BRIEF DESCRIPTION OF THE DRAWINGS

FIG. 1E illustrates a side view of the electrical box disposed within an opening of a wall having a first thickness;

FIG. 1F illustrates a side view of the electrical box disposed within an opening of a wall having a second thickness;

The reference symbols used in the drawings, and their meanings, are listed in summary form in the list of reference symbols. In principle, identical parts are provided with the same reference symbols in the figures.

DETAILED DESCRIPTION

Figure 1A:
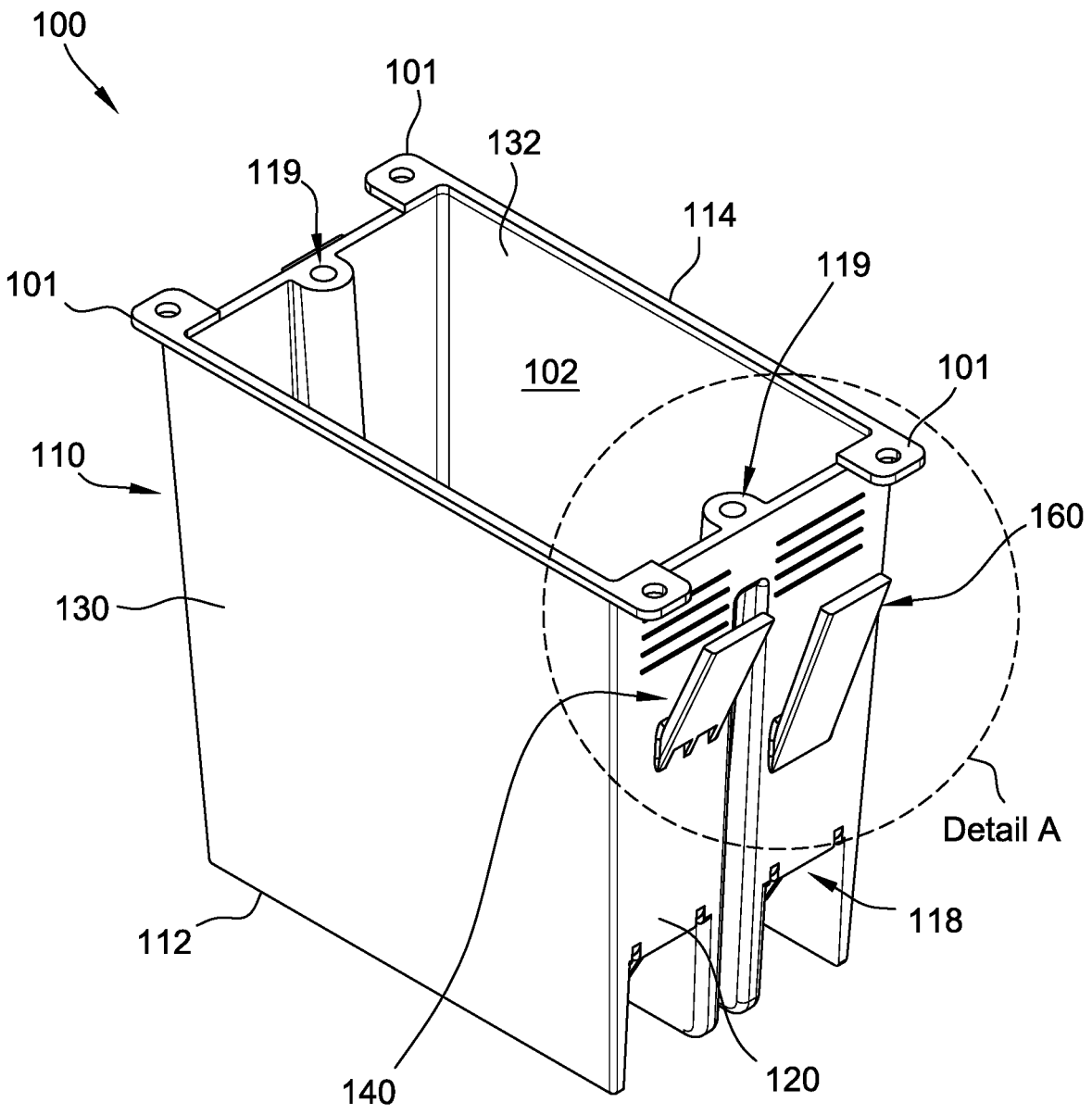
FIG. 1A illustrates a perspective view of an electrical box in accordance with an embodiment of the present disclosure.

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

Embodiments of the present disclosure are directed to an "old work" retrofit electrical box. The retrofit electrical box includes a housing having a closed end, opposing first sidewalls, and opposing second sidewalls extending from the closed end. At least one wall engagement member is provided on at least one of the opposing first sidewalls and the opposing second sidewalls to engage an inner surface of a wall upon insertion of the housing into an opening along the wall. The at least one wall engagement member includes a first pair of cantilevered barbs disposed on one of the opposing first sidewalls and opposing second sidewalls. The first pair of cantilevered barbs have a base integral to the opposing first sidewall and a cantilevered end extending from the base away from the closed end of the housing. The at least one engagement member further includes a second pair of cantilevered barbs disposed on one of the opposing first sidewalls and opposing second sidewalls. The second pair of cantilevered barbs have a base integral to the opposing first sidewall and a cantilevered end extending from the base away from the closed end of the housing. The first wall engagement members are configured to apply biasing force against an inner surface of a wall having a first thickness upon full insertion of the housing into the opening. The second wall engagement members are configured to apply biasing force against an inner surface of a wall having a second thickness upon full insertion of the housing into the opening.

As used herein, the term "electrical box" denotes an enclosure into which light switches, electrical outlets and other devices are installed into. Electrical boxes are commonly affixed to studs prior to installing drywall over the studs. As used herein, the term "old work electrical box" denotes an electrical box that may be used either as a replacement electrical box or a newly installed electrical box, and may be located between studs. As used herein, the term "drywall" refers to a flat panel material installed and fastened over studs in commercial and residential applications. As will be explained in further detail below, the retrofit electrical boxes described herein include engagement members which are configured to interlock with North American drywall panels having standard ½-inch (12.7 mm), ⅝-inch (15.9 mm), and/or a ⅜-inch (9.5 mm) thicknesses. It is understood that the wall engagement members may be configured to interlock with any thickness drywall. It is also understood that the wall engagement members may be configured to interlock with wood planks, plywood, engineered particleboard, sheetrock, gypsum panels, plasterboard or other flat panel materials. By way of example, but not limitation, the wall engagement members may be configured to interlock with European gypsum panels having standard thicknesses in the range of 9.5 mm (0.374 inches) to 25 mm (0.984 inches) or larger.

Figure 1B:
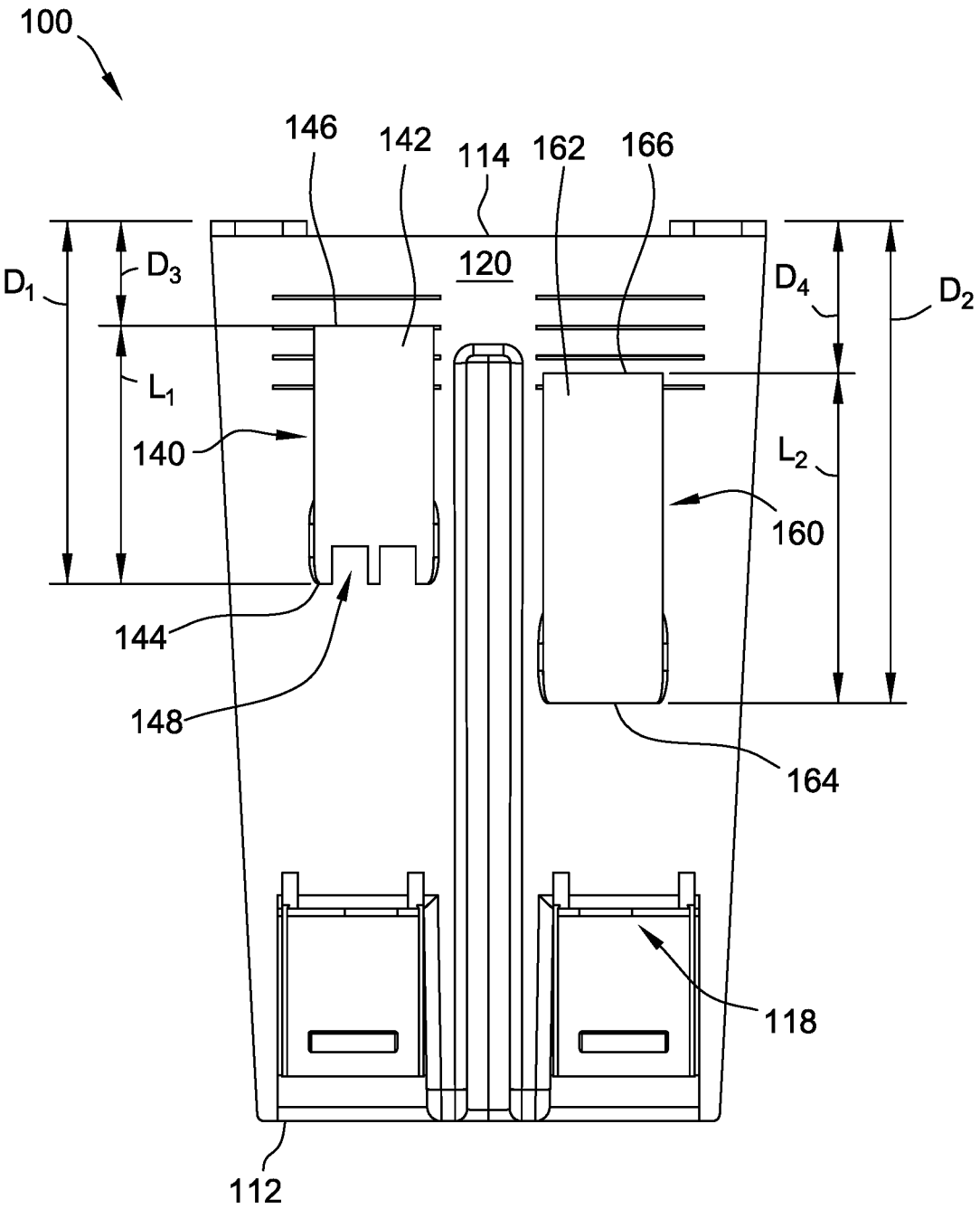
FIGS. 1B and 1C illustrate side views of the electrical box of FIG. 1A.
Figures 1C, 1D:
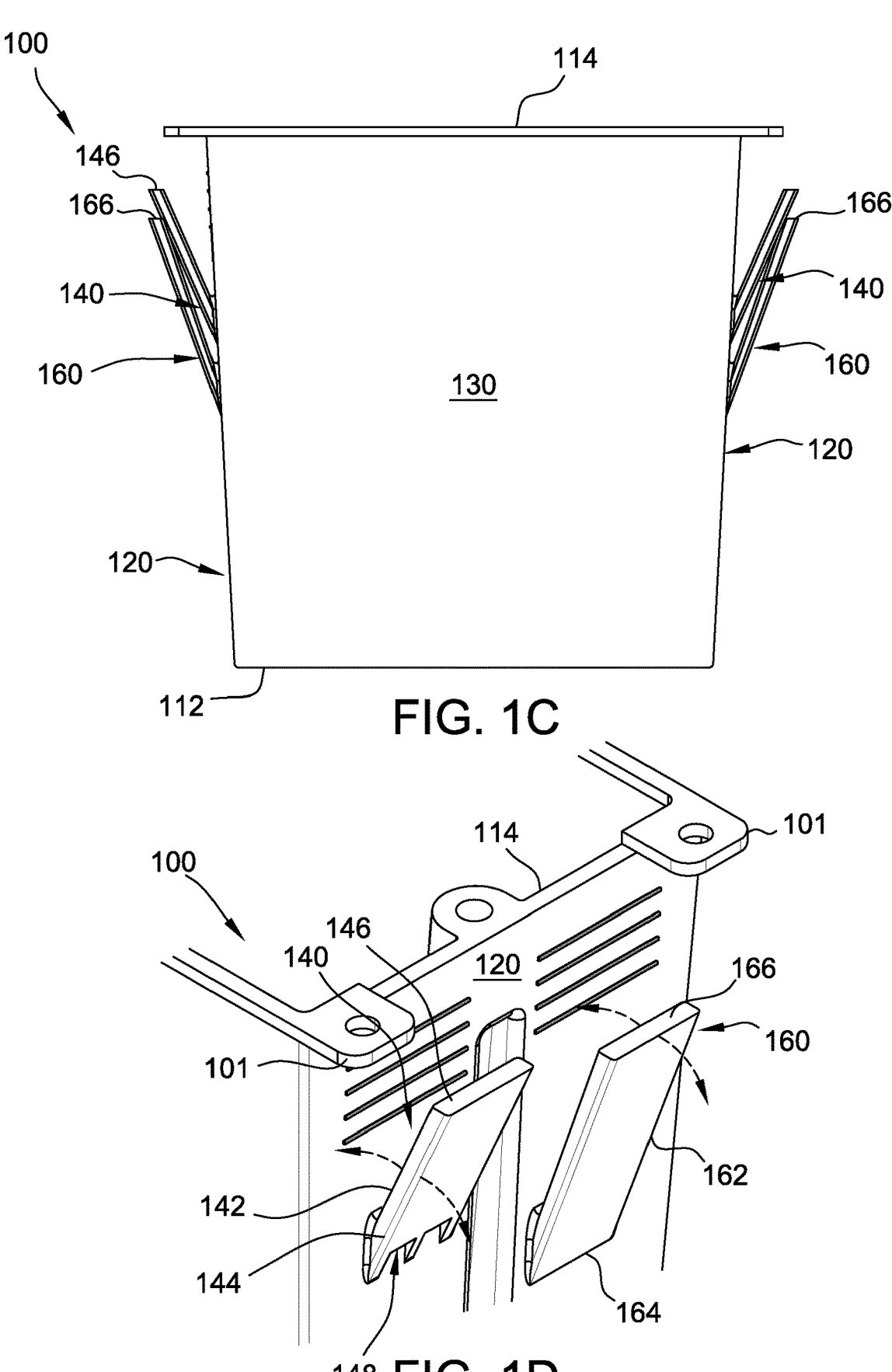
FIG. 1D illustrates a detailed view of the electrical box of FIG. 1A.

FIG. 1A illustrates a perspective view of an electrical box 100 in accordance with an embodiment of the present disclosure. More specifically, electrical box 100 is an old work electrical box. The electrical box 100 is adapted to be located between studs. The electrical box of the present disclosure may be closely adjacent a stud member or a distance from stud members, and may comprise a retrofit/replacement of an existing electrical box or comprise a new installation electrical box. FIGS. 1B and 1C provide side views of the electrical box 100 and FIG. 1D illustrates an enlarged view of the area enclosed in the area identified as DETAIL A in FIG. 1A.

Referring to FIGS. 1A through 1D, the electrical box 100 includes a rectangularly-shaped housing 110 having a closed end 112, open end 114, opposing first sidewalls 120, and opposing second sidewalls 130. The sidewalls, 120 and 130 extend from the closed end 112 to the open end 114. The closed end 112, open end 114, opposing first sidewalls 120, and opposing second sidewalls 130 define a receptacle compartment 102 for receiving commercial or residential light switches, electrical outlets and other devices from the open end 114. The electrical box 100 further includes cable termination openings 118 to enable electrical cables to be fed through housing 110, located in compartment 102 and electrically connected with the electrical device positioned in the receptacle compartment 102. The electrical device may be secured to the housing 110 by conventional fasteners that are threadably inserted in threaded bores 119 extending from the open end 114 a distance into the receptacle compartment 102. In the illustrated embodiment, the threaded bores 119 are positioned on inner surfaces 122 of the opposing first sidewalls 120, however it is understood that the threaded bores 119 may also (or alternatively) be positioned on inner surfaces 132 of the opposing second sidewalls 130.

The electrical box 100 further includes lateral tabs 101 located at open housing end 114. The lateral tabs 101 extend outward from the opposing first sidewalls 120. Each of the lateral tabs includes an opening that is adapted to receive a fastener such as a screw to anchor the housing to the drywall or another anchoring surface. When the closed end 112 is inserted in the drywall opening, the lateral tabs 101 are configured to serve as a stop against an outer surface of the wall to impede placement of the electrical box 100 wholly through the opening of the wall.

The electrical box 100 further includes a first wall engagement member 140 and a second wall engagement member 160. In the embodiments shown in FIGS. 1A through 1D, the first wall engagement member 140 and the second wall engagement member 160 extend from the opposing first sidewalls 120. The wall engagement members 140, 160 extending from the opposing first sidewalls 120 is shown in FIG. 1C. As will be explained in further detail below, the first wall engagement member 140 and the second wall engagement member 160 may alternatively extend from the opposing second sidewalls 130, or both of the opposing first sidewalls 120 and the opposing second sidewalls 130.

As best shown in FIGS. 1B through 1D, the first wall engagement members 140 each include a cantilevered barb 142. The cantilevered barb 142 is planar and includes a base 144 integral to the first sidewall 120 and a movable barb end 146 located away from the base 144, and is directed from the base, toward the open end 114 of the housing 110. As shown in FIG. 1B, each first wall engagement member 140 has a length $L_1$, and the base 144 of the first wall engagement member 140 is positioned a distance $D_1$ from the open end 114 of the housing 110.

The second wall engagement members 160 each include a barb 162. Like barb 142, barb 162 is planar. The second wall engagement members are disposed on the opposing first sidewalls 120. The planar barb 162 has a base 164 integral to the associated first sidewall 120, and an end 166. The end 166 is located away from the base 164 and is directed toward open end 114 of the housing 110. The second wall engagement members 160 have a length $L_2$, defined between the base 164 and the end 166. The base 164 of each of the second wall engagement members 160 is positioned a distance $D_2$ from the open end 114 of the housing 110. Distance $D_2$ is defined between the base 164 and the tabs 101. As shown in FIG. 1A each pair of wall engagement members 140 and 160 located along the respective first sidewall are parallel and located side-by-side. The members are able to flex or elastically deform about their respective fixed ends so that their ends are movable a distance toward and away from the respective first sidewall when the housing is inserted for installation, through a drywall opening.

More specifically, the length $L_1$ and the distance $D_1$ of the first wall engagement member 140 have a magnitude that enables the barbs 142 to flex toward the associated first sidewall and elastically deform when the barb contacts the drywall as the housing 110 is passed through the opening in the drywall. Once the housing is located in the drywall opening the barb members return to the member orientation before being flexed as a result of the engagement with the wall. Similarly, the length $L_2$ and the distance $D_2$ of the second wall engagement member 160 generally has a magnitude that enables the barbs 162 to flex toward the associated first sidewall and elastically deform when the barb contacts the drywall as the housing 110 is passed through the opening in the drywall. Like the first wall engagement member 140, once the housing is located in the drywall opening the barbs 162 return to the member orientation before being flexed as a result of engagement with the wall.

The direction of flexing or elastic deformation of the barbs 142, 162 toward and away from the first sidewalls 120 is represented by dashed arrows provided in FIG. 1D. As the electrical box 100 is partially inserted into the opening of the wall, the first wall engagement members 140 or the second wall engagement members 160 are in the retracted state. As the electrical box 100 is fully inserted into the opening in the drywall, the end of either the first wall engagement members 140 or the second wall engagement members 160 (depending on the thickness of the wall) contacts the drywall and the contact causes the associated barb to flex. The flexing causes the specific first wall engagement members 140 or the second wall engagement members 160 to apply a engage the inner surface of the wall to secure the electrical box 100 in the opening.

Figures 1E, 1F:
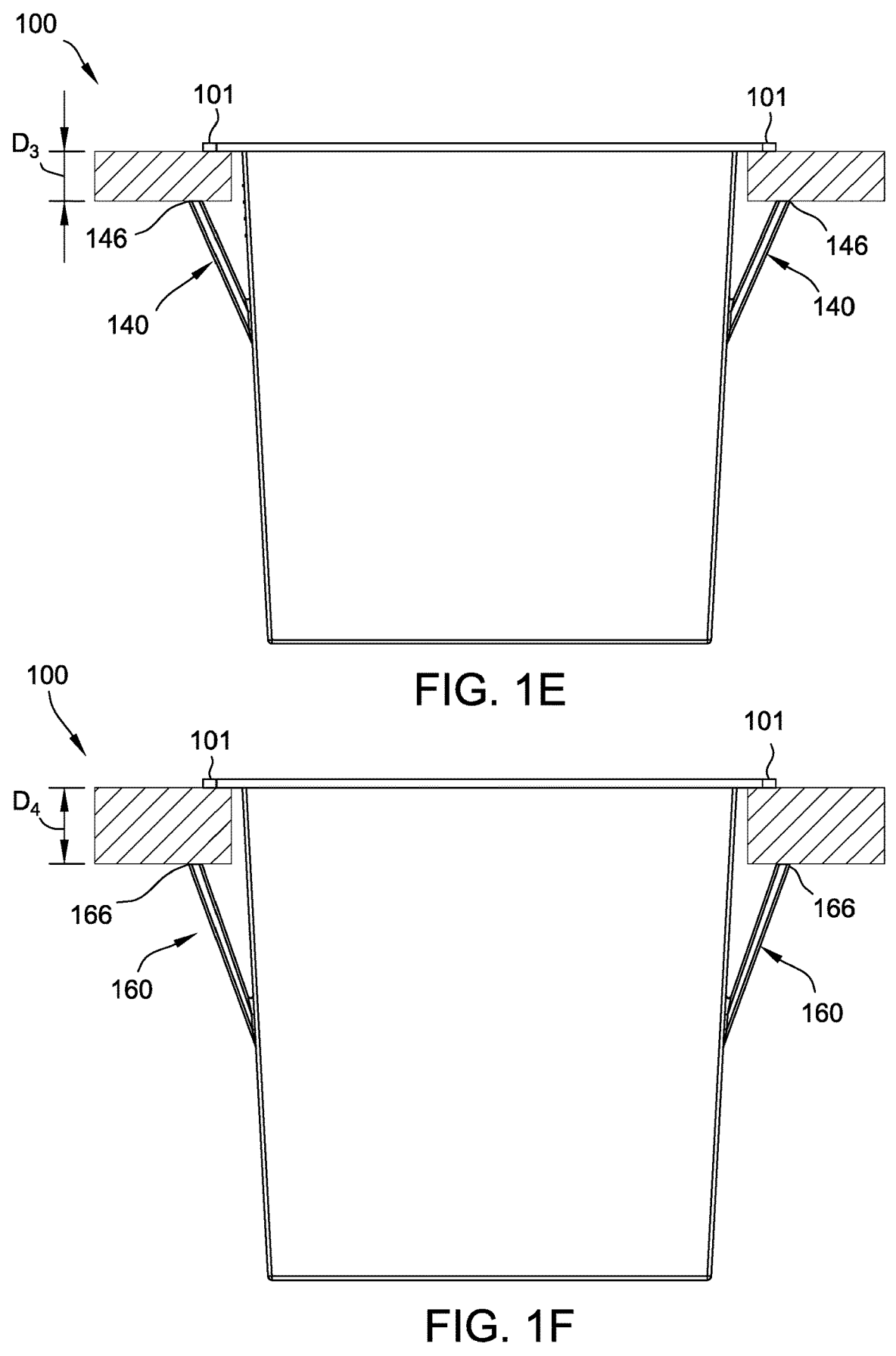

Drywall may have different thicknesses. By way of example, in residential and commercial applications, North American drywall commonly has thicknesses of 0.5 inches (12.7 mm) or 0.375 inches (9.5 mm). The first and second wall engagement members 140, 160 of the electrical box 100 of the present disclosure accommodate the different drywall thicknesses. For example, the first wall engagement members 140 generally are sized to engage the inner surface of a 0.375-inch (9.5 mm) wall. The difference between the dimension $D_1$ and $L_1$ defines the distance $D_3$ between the barb barb end 146 and the lateral tabs 101. The $D_3$ dimension is of a magnitude to accommodate the drywall between the barb end 146 and the tab 101 as shown in FIG. 1E. The second wall engagement members 160 generally are sized to engage the inner surface of a 0.5-inch (12.7 mm) wall. The difference between the dimension $D_2$ and $L_2$ defines the distance $D_4$ between the barb end 166 and the lateral tabs 101. The $D_4$ dimension is of a magnitude to accommodate the drywall between the end 166 and the tab 101 as shown in FIG. 1F.

Referring back to FIG. 1B, the barb end 146 of barb 142 extends beyond end 166, and is located at a lateral position with dimension $D_4$. As a result, the first wall engagement member 140 would impede the movement of drywall with a thickness of 0.5 in (12.7 mm) between the barb 162 and the tab 101. In order to prevent the first wall engagement member 140 from interfering with the movement of the drywall, the base 144 of the barbs 142 includes perforations 148. The perforations minimize the surface area of the base 144 connected to the first sidewall 120. As a result, when required, the perforations enable the easy removal of the first engagement members from their locations along the first sidewall 120 allowing the electrical box 100 to be inserted in the hole in drywall with a 0.5 in thickness. The perforations facilitate the barbs 142 to be snapped off of the electrical box 100.

An end user such as an electrical contractor or homeowner can purchase the electrical box 100 which includes both of the first wall engagement members 140 and the second wall engagement members 160, and easily install the electrical box in locations within drywalls comprising different thickness. In use, when the wall in which the electrical box 100 is being installed is 0.375 inches (9.5 mm) thick, the end user merely has to insert the electrical box 100 into the opening of the wall and the first wall engagement members 140 will elastically deform and subsequently spring back to engage the inner surface of the 0.375-inch (9.5 mm) thick wall. The end 166 of second wall engagement member 160 is located a distance from the 0.375 in thick drywall. Alternatively, if the wall which the electrical box 100 is being installed into is 0.5 inches (12.7 mm) thick, the user can snap off the first wall engagement members 140 at the perforations prior to inserting the electrical box 100 into the 0.5-inch (12.7 mm) thick wall. With the first wall engagement members 140 removed, the second wall engagement members 160 will be free to engage the drywall against the inner surface of the 0.5-inch (12.7 mm) thick wall.

It is understood that flat panels such as drywall may have any standard thickness depending on application and region. Thus, the length $L_1$ and the distance $D_1$ of the first wall engagement member 140 generally may be sized to receive a wall having a first specific thickness; and likewise the length $L_2$ and the distance $D_2$ of the second wall engagement member 160 generally may be sized to receive a wall having a second specific thickness.

Figure 2:
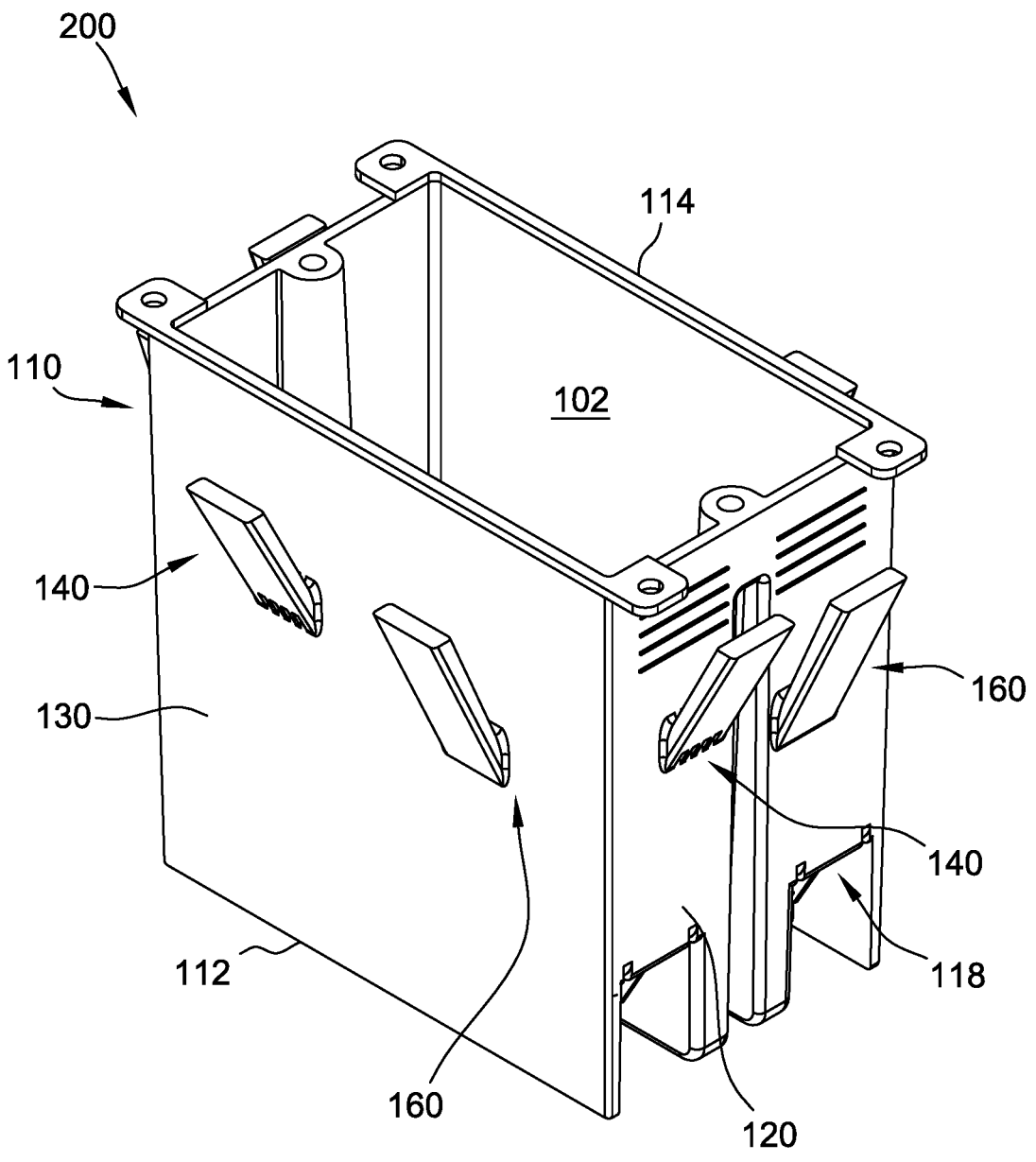
FIG. 2 illustrates a perspective view of an electrical box in accordance with an embodiment of the present disclosure.

FIG. 2 illustrates a perspective view of alternate embodiment electrical box 200. The electrical box 200 is substantially the same as the electrical box 100 and includes the features and functionality of electrical box 100 as previously described. In addition to the features and functionality of electrical box 100, electrical box 200 also includes the first engagement members 140 and second engagement members 160 located on the second sidewalls 130. FIG. 2 specifically shows the wall engagement members 140, 160 on one of the second sidewalls 130 and it should be understood that the first and second engagement members 160 may be similarly provided along the opposed second sidewall 130. The first wall engagement member 140 and the second wall engagement member 160 may be positioned on either or both of the opposing first sidewalls 120 and opposing second sidewalls 130 depending on the location of studs adjacent to the opening of the wall. Locating the wall engagement members on sidewalls 130 and the sidewalls 120, enables the electrical box 200 to be oriented horizontally or vertically along the drywall, and leverage the support provided by the wall engagement members 140, 160.

Figure 3:
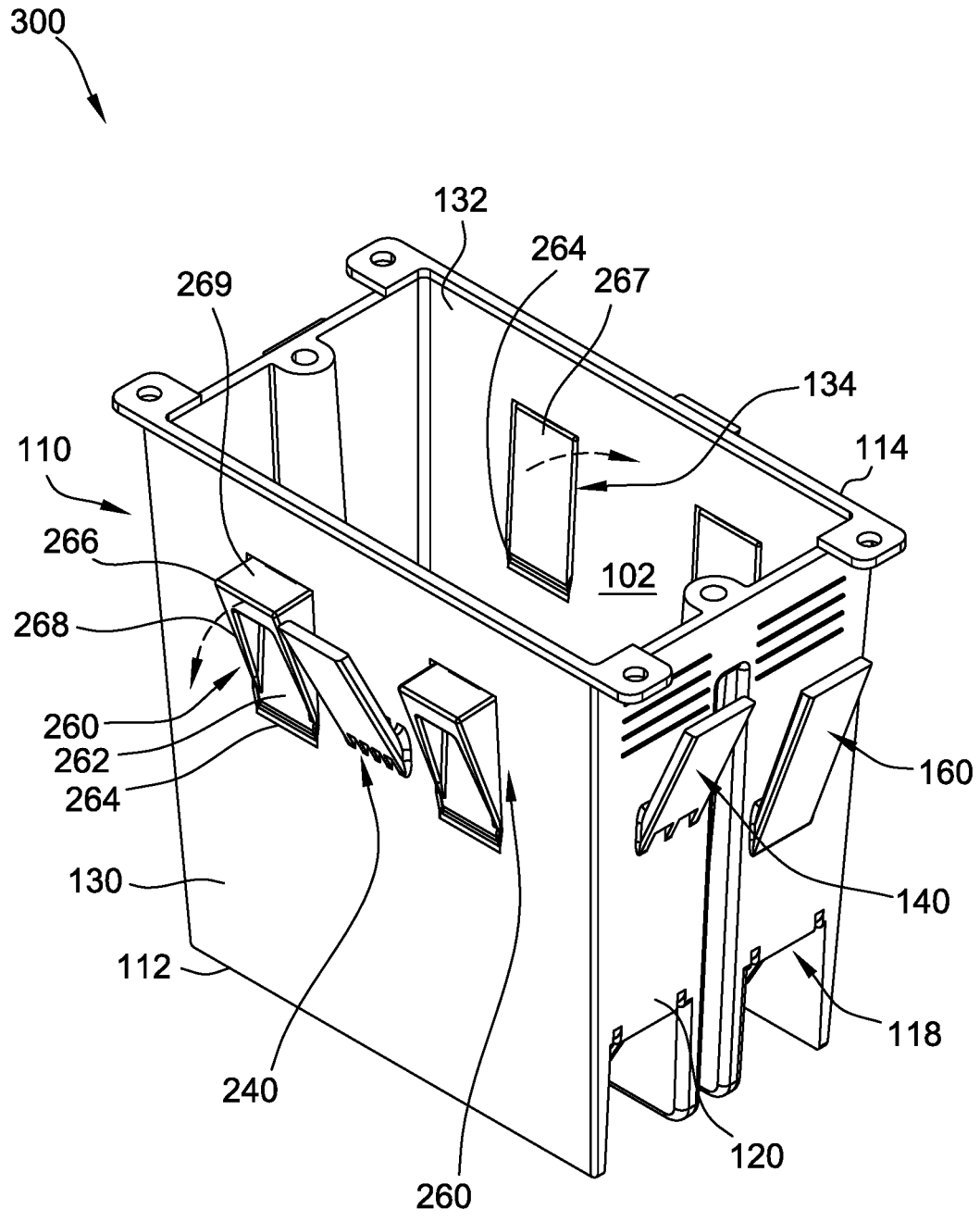
FIG. 3 illustrates a perspective view of an electrical box in accordance with an embodiment of the present disclosure.

FIG. 3 illustrates an alternative embodiment electrical box 300. In the illustrated alternate embodiment electrical box 300, at least one second wall engagement member 260 is disposed on the opposing second sidewalls 130. As shown in FIG. 3, two second wall engagement members 260 are provided along the second sidewall 130. The second wall engagement member 260 comprises a barb 262 having a base 264 pivotally connected to the second sidewall 130 and an end 266 extending from the base 264 toward open end 114 of the housing 110.

The base has a planar surface 269. Each barb 262 includes support ribs 268 extending between the base 264 and the end 266. A surface 267 joins the ribs and end, and the ribs 268, end 266 and surface 267 collectively define a hollow barb interior. The ribs, surface and end are moveable as a unitary member about pivotal base. The flat surface 269 provides a surface area to contact the drywall that is larger than the contact surfaces defined at ends 146, 166 of the respective first and second engagement members. As shown in FIG. 3, previously described first wall engagement member 140 may also be located along sidewall 130 between second engagement members 260.

In some embodiments, the opposing second sidewalls 130 include openings 134 at the second wall engagement members 260 such that the first pair of cantilevered barbs 262 may pass through the openings 134 upon insertion of the electrical box 300 into the opening of the wall. The base 264 is configured to enable the barb to elastically pivot and move the ribs 268 and the end 266 at least partially through the opening and into the receptacle compartment 102 of the electrical box 300 when the second wall engagement members 260 contact the drywall as the electrical box is passed through the drywall opening. Upon full insertion of the electrical box 300 into the opening of the wall, the end 266 can be urged outwardly from the compartment 102 by pressing against an inner surface 267 of the barb 262.

The pivotable base 264 of the second wall engagement members 260 is configured to elastically pivot such that the second wall engagement members 260 are movable between an extended state (as shown in FIG. 3), and a retracted state where the second wall engagement members 260 are displaced inwardly at least partially through the openings 134 of the opposing second sidewalls 130.

Figures 4A, 4B:
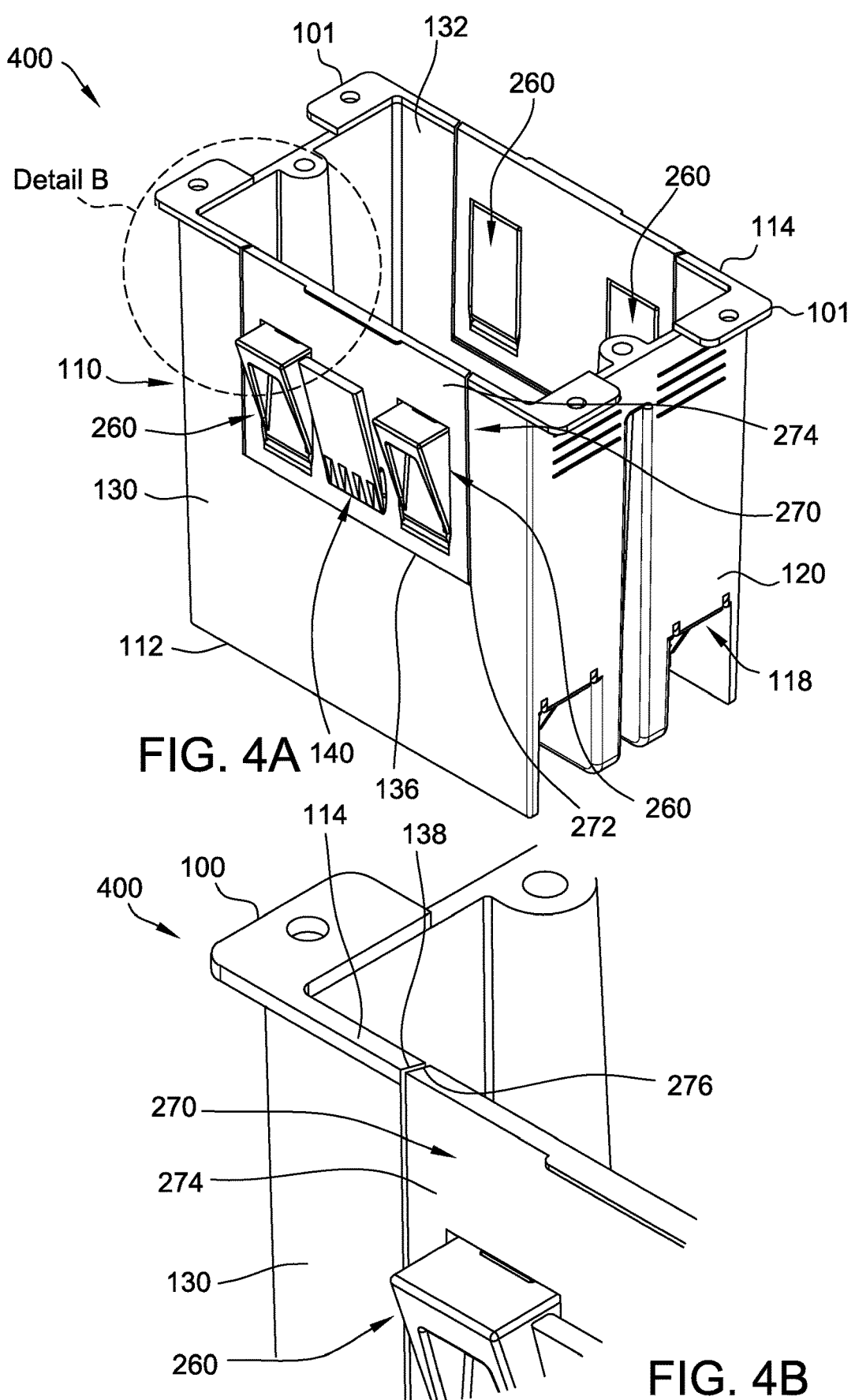
FIG. 4A illustrates a perspective view of an electrical box in accordance with an embodiment of the present disclosure.
FIG. 4B illustrates a detailed view of the electrical box of FIG. 4A.

FIG. 4A illustrates a perspective view of the electrical box 300 previously described and further including a pivotable segment 270 integral with the opposing second sidewalls 130. The detail view of FIG. 4B shows the relative alignment between a portion of the segment 270 and the second sidewall 130. The first wall engagement members 140 and the second wall engagement member 260 are disposed on the pivotable segment 270. The pivotable segment 270 comprises a panel 274 having a base 272 that is connected to the sidewall 130. The base 272 is configured to enable panel 274 to elastically pivot a distance into the receptacle compartment 102 as the electrical box 100 is inserted into the opening along the wall. Upon full insertion of the electrical box 100 into the opening of the wall, the panel 274 can be urged outwardly by pressing against an inner surface 247 of the inner surface of the panel 274.

In some embodiments, angled lateral edges 276 of the panel 274 are acute relative to the panel 274 such that the angled lateral edges 276 interlock with corresponding angled lateral edges 138 of the opposing second sidewalls 130. The edges (276, 138) interlock together and the panel 274 cannot be urged inward after the electrical box 100 has been fully inserted into the wall opening.

Figure 5:
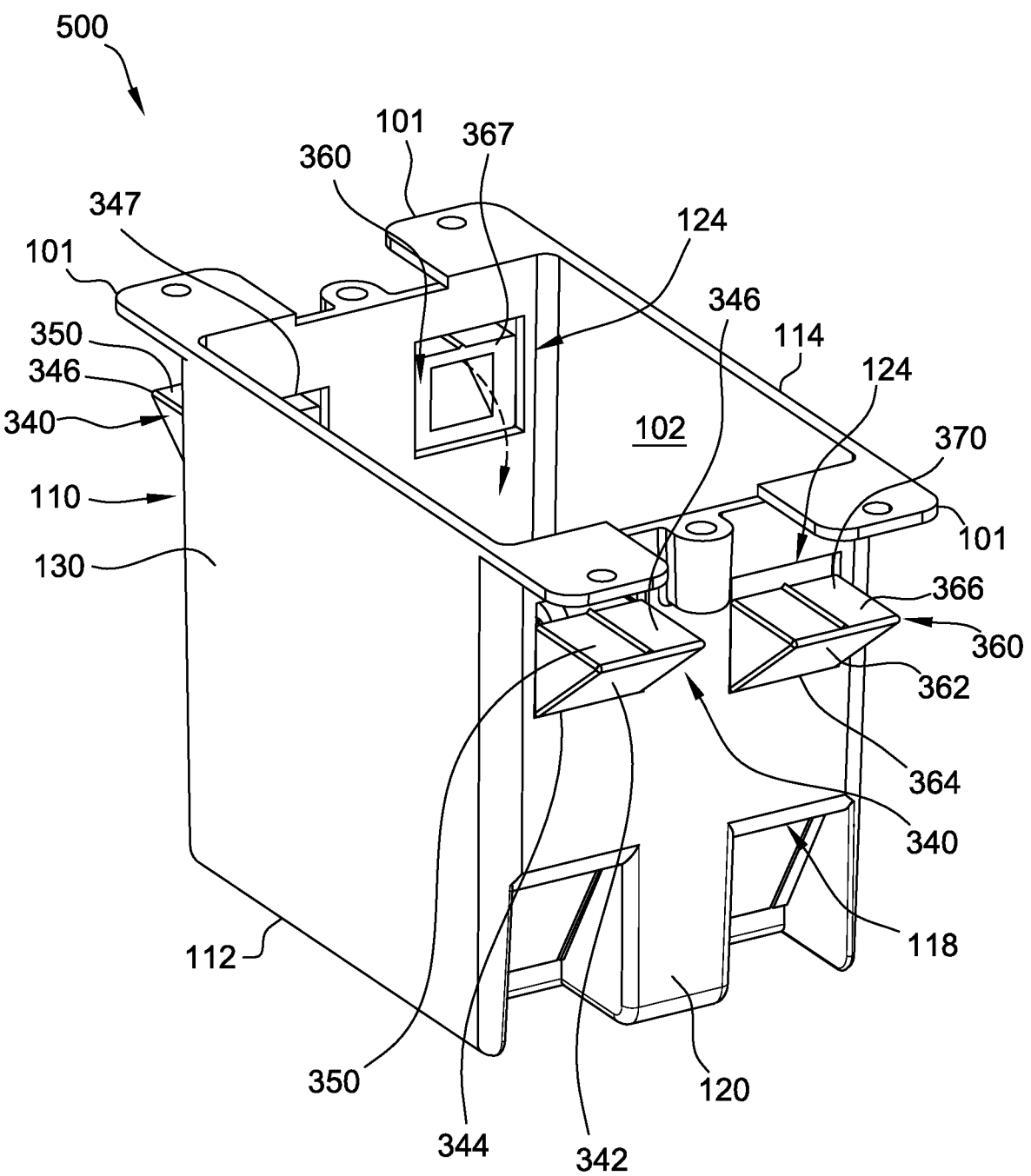
FIG. 5 illustrates a perspective view of an electrical box in accordance with an embodiment of the present disclosure.

FIG. 5 illustrates a further alternative embodiment electrical box 500 of the present disclosure. In the illustrated embodiment, the opposing first sidewalls 120 include a first wall engagement member 340 and a second wall engagement member 360.

The first wall engagement member 340 comprises a wedge-shaped barb 342 with a flat contact surface 350. When installed, the drywall is located in the distance separating the tabs 101 and surface 350. The barb has a base 344 joined with the opposing first sidewall 120. The connection between the base and first sidewall enables pivotal movement of the barb 342 relative to the sidewall. The wedge-shaped barb extends outwardly from the opposing first sidewall 120 and terminates at end 346. The end 346 extends from the base 344 away from the opposing first sidewall 120.

The second wall engagement member 360 comprises a wedge-shaped barb 362, and a base 364 that is joined to the opposing first sidewall 120 and enables the barb to pivotally move relative to the sidewall. Second engagement member 360 also includes an end 366 opposite the base 364. The wedge-shaped barb 362 extends outward from the sidewall and terminates in the end 366. Like surface 350, previously described, barb 362 includes surface 370 extending between the base 364 and end 366. The distance separating the surface 370 and lateral tab 101 previously identified as $D_4$ shown in FIG. 1F is greater than the distance separating the surface 350 and tab 101 previously identified as $D_3$ shown in FIG. 1E. As a result, the second engagement member 360 is able to receive drywall with a thickness of 0.5 in. for example, and first engagement member 340 is able to receive drywall with a thickness of 0.375 in. for example.

The opposing first sidewalls 120 include openings 124 closely adjacent the first and second wall engagement members 340, 360. FIG. 5 shows one of the openings 124 proximate second wall engagement member 360. Note that the arrangement between the wall engagement members 340, 360 and associated opening 124 is similar to the specific arrangement between the second engagement member 360 and opening 124 shown in FIG. 5. The barbs 342, 362 of the first and second wall engagement members 340, 360 are able to pivot about base 344, 364 and pass through the openings 124 upon insertion of the electrical box 500 into the opening of the wall.

As previously described with the electrical boxes 100, 200, and 300, the base of each engagement member is configured to elastically pivot and enable the barb to partially pass through the opening 124 and into the receptacle compartment 102 as the electrical box 100 is at least partially inserted into the opening of the wall. Upon full insertion of the electrical box 500 into the opening of the wall, the barbs can be urged outwardly from compartment 102 by pressing against the barb members. Like barb 142 of first wall engagement member 140 of electrical box 100 that is partially located in the lateral extent of distance $D_4$ separating tab 101 and barb 162, barb 342 is also partially located in the lateral extent of the distance separating tab 101 and barb 362 and would impede the insertion of the drywall between the tab 101 and surface 370.

When anchoring the electrical box to a larger thickness wall and locating the wall between tab 101 and surface 370, it is necessary to move barb 362 so that the barb does not impede the mounting process. In such situations, the barb 362 is able to be passed completely through the opening 124. The end 346 is deformed and as a result the barb 342 is passed completely into compartment 102, so that the barb does not impede the movement of the wall between the tab and surface 370.

Figures 6, 7:
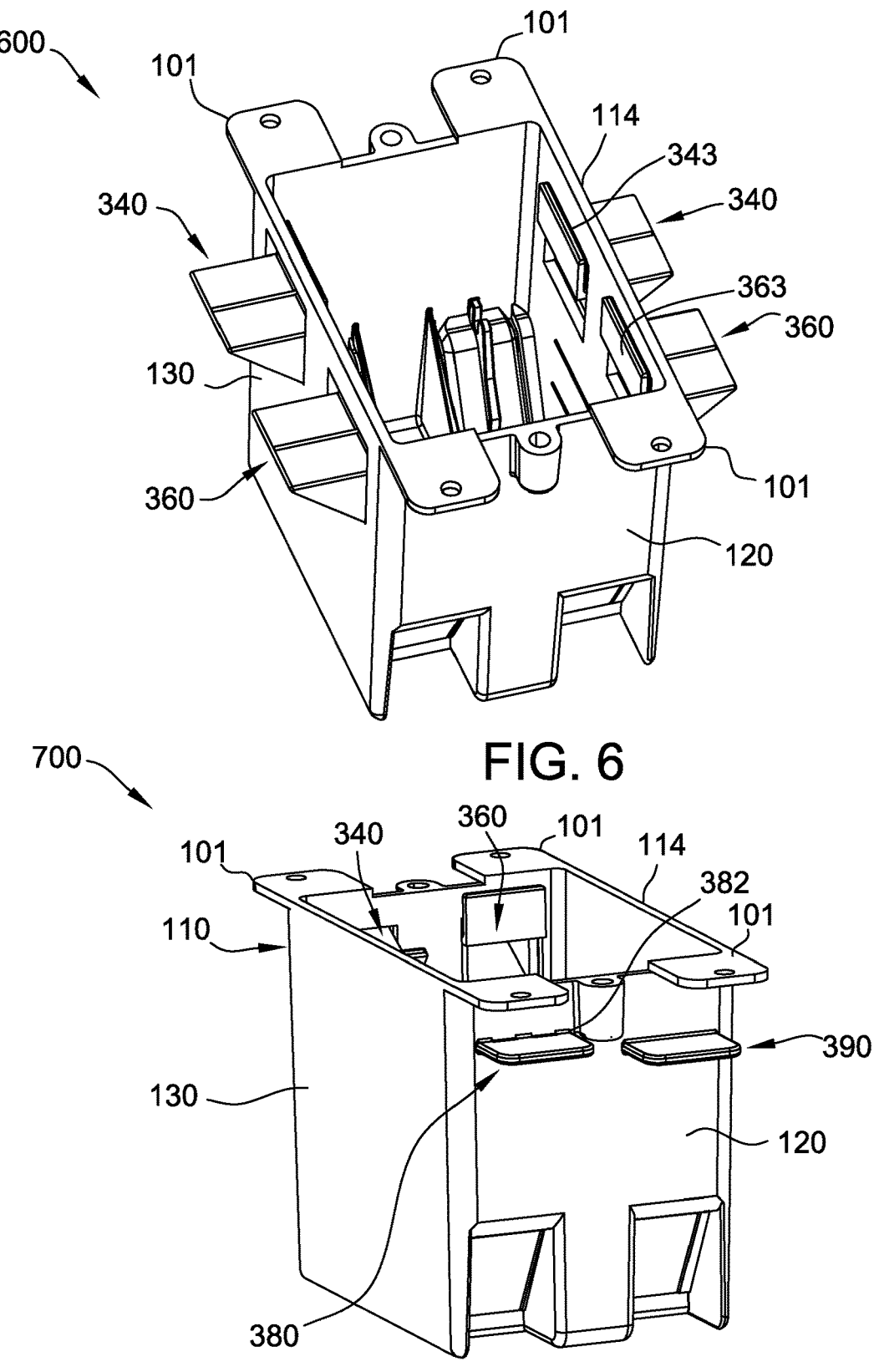
FIG. 6 illustrates a perspective view of an electrical box in accordance with an embodiment of the present disclosure.
FIG. 7 illustrates a perspective view of an electrical box in accordance with an embodiment of the present disclosure.

FIG. 6 illustrates a further alternate embodiment of an electrical box 600 of the present disclosure. In electrical box 600, the first wall engagement members 340 and the second wall engagement members 360 previously described relative to electrical box 500 are positioned on the opposing second sidewalls 130. Additionally, the first and second wall engagement members 340, 360 further respectively include a push tab 343, 363. The tabs 343 and 363 are perpendicular to the respective surfaces 350, 370 of the wall engagement members and extend upwardly from the surfaces toward open end 114. The tabs may be contacted when the barb is partially located in compartment 102 to urge the associated wall engagement member outwardly, and thereby return the wall engagement member to the fully extended orientation shown in FIG. 6. The tabs 343, 363 may also contact the interior of the sidewall to limit the extent that the barbs are able to move to the extended orientation.

FIG. 7 illustrates a further alternative embodiment electrical box 700 of the present disclosure. The electrical box 700 includes the first wall engagement member 340 and the second wall engagement member 360 previously described relative to electrical boxes 500, 600 positioned on a first sidewall 120. The electrical box 700 further includes a first pivot tab 380 and a second pivot tab 390 extending outwardly from first sidewall 120 opposite the wall that includes wall engagement members 340, 360. As shown in FIG. 7, the first pivot tab 380 is aligned with the first wall engagement member 340 and the second pivot tab 390 is aligned with the second wall engagement member 360. The first pivot tab 380 and second pivot tab 390 are parallel to the lateral tabs 101 extending outward from the opposing first sidewalls 120. Either one of the first pivot tab 380 and second pivot tab 390 can be used together with either one of the first wall engagement member 340 and the second wall engagement member 360 depending on the thickness of the wall into which the electrical box 100 is being inserted.

Similar to the first wall engagement member 140 of electrical box 100 and shown in FIG. 1B, the first pivot tab 380 includes perforations 382 that connect the first pivot tab to the first sidewall 120. The perforations 382 allow the connection points between the opposing first sidewall 120 and pivot tab 380 to be broken, enabling the pivot tab 380 to be removed when it is necessary to locate drywall in the distance separating tab 101 and pivot tab 390. In such a situation, the first wall engagement member 340 may be relocated in compartment 102 as previously described herein.

The electrical box 700 of FIG. 7 is inserted into the opening of the wall by (depending on the thickness of the drywall) positioning either the first pivot tab 380 or the second pivot tab 390 against the inner surface of the wall and subsequently inserting the first wall engagement member 340 or the second wall engagement member 360 depending on the thickness of the wall into which the electrical box 700 is being anchored. Once located between the tab 101 and associated pivot tab 380, 390 the respective wall engagement members 340, 360 are elastically deformed as previously described, until the drywall is located between the barb surface 350, 370 and associated tab 101.

Figure 8:
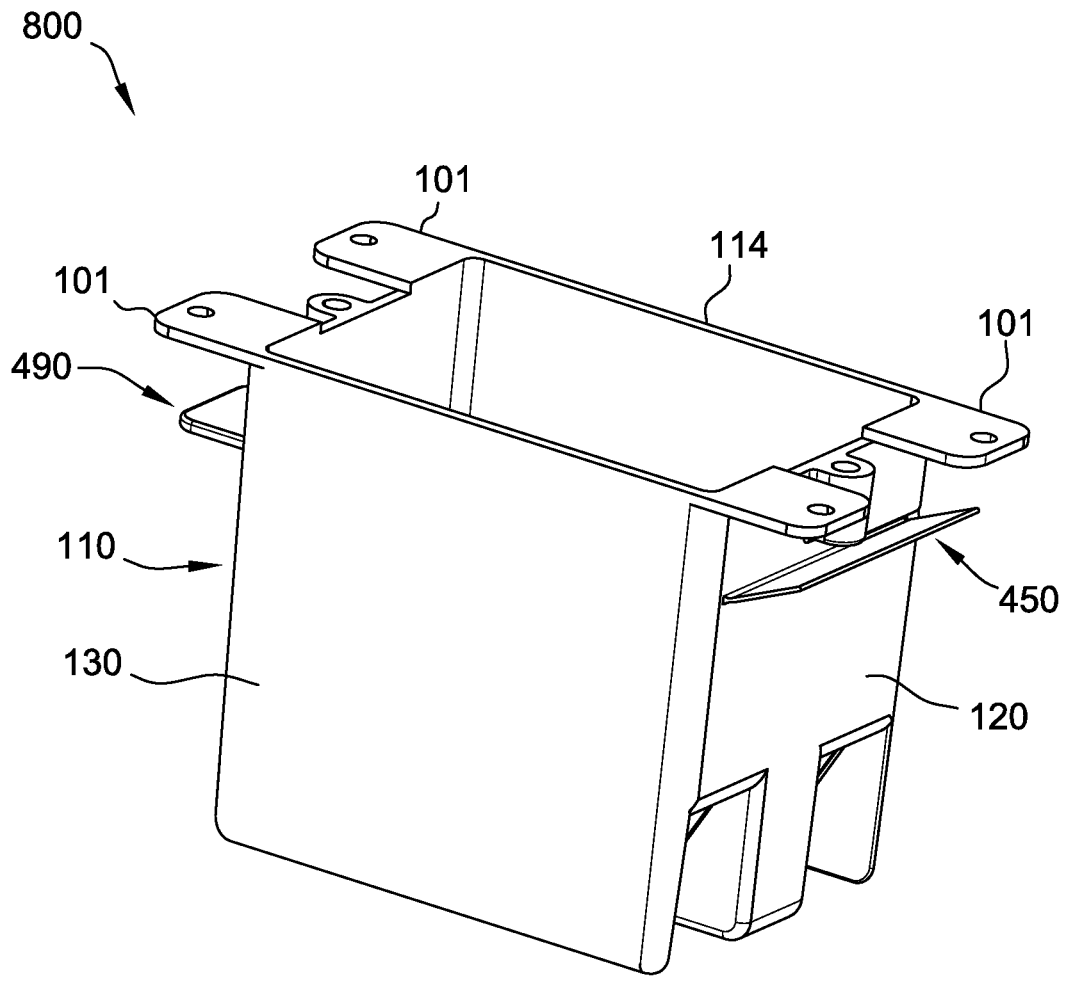
FIG. 8 illustrates a perspective view of an electrical box in accordance with an embodiment of the present disclosure.

FIG. 8 illustrates a further alternate embodiment electrical box 800 of the present disclosure. The electrical box 800 of FIG. 8 includes an elongate wall engagement member 450 configured to apply a biasing force against a wall having a thickness. The wall member is inserted in the distance separating the tabs 101 and the wall engagement member 450. The wall engagement member 450 is oriented at an angle relative to sidewall 120. When the wall member is located between member 450 and tab 101 the member 450 remains in contact with the wall member.

The electrical box 800 of FIG. 8 further includes a pivot tab 490 located on sidewall 120 opposite the opposing first sidewall 120 supporting wall engagement member 450. The pivot tab is elongate and extends along sidewall 120 between opposing sidewalls 130. Alternatively, the pivot tab may not be elongate and may comprise the length similar to the length of the pivot tab 390 shown in electrical box 700 of FIG. 7. The distance separating pivot tab 490 and tabs 101 is substantially the same as the distance separating the free end of engagement member 450 and tabs 101. In use, the wall is located between the pivot tab and tabs 101 and then electrical box is pivoted until the wall is located between engagement member 450 and tabs 101. In the illustrated embodiment the wall engagement member 450 and the pivot tab 490 are positioned on the opposing first sidewalls 120, however it is understood that the wall engagement member 450 and the pivot tab 490 may be positioned on the opposing second sidewalls 130.

FIGS. 9A through 9E illustrate a further alternate embodiment electrical box 900. The electrical box 900 includes a wall engagement member 550 configured to support a wall when the wall member is located in the distance separating the tab and the wall engagement member 550. The wall engagement member 550 is disposed along both of opposing first sidewalls 120. As shown in FIG. 10, the wall engagement member 550 can alternatively be disposed on the opposing second sidewalls 130. When disposed on sidewalls 130, member 550 may comprise an elongate member.

Figure 9A:
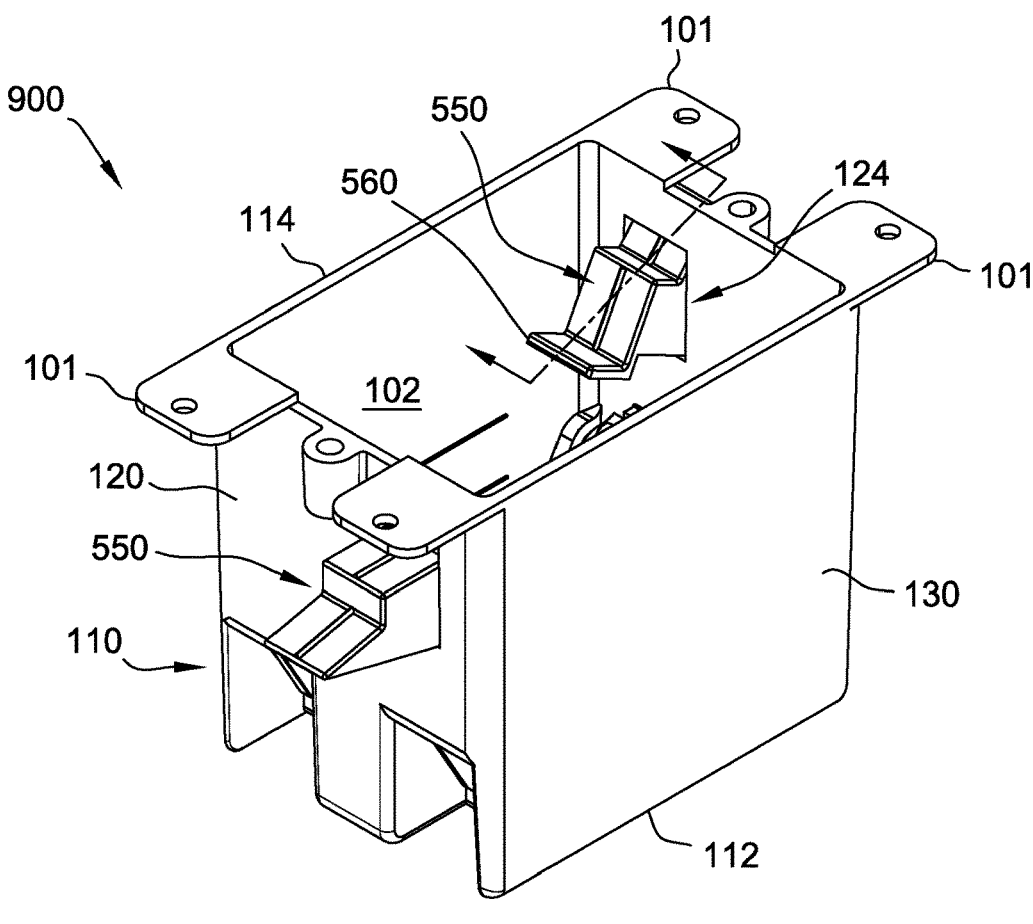
FIG. 9A illustrates a perspective view of an electrical box in accordance with an embodiment of the present disclosure.
Figure 9B:
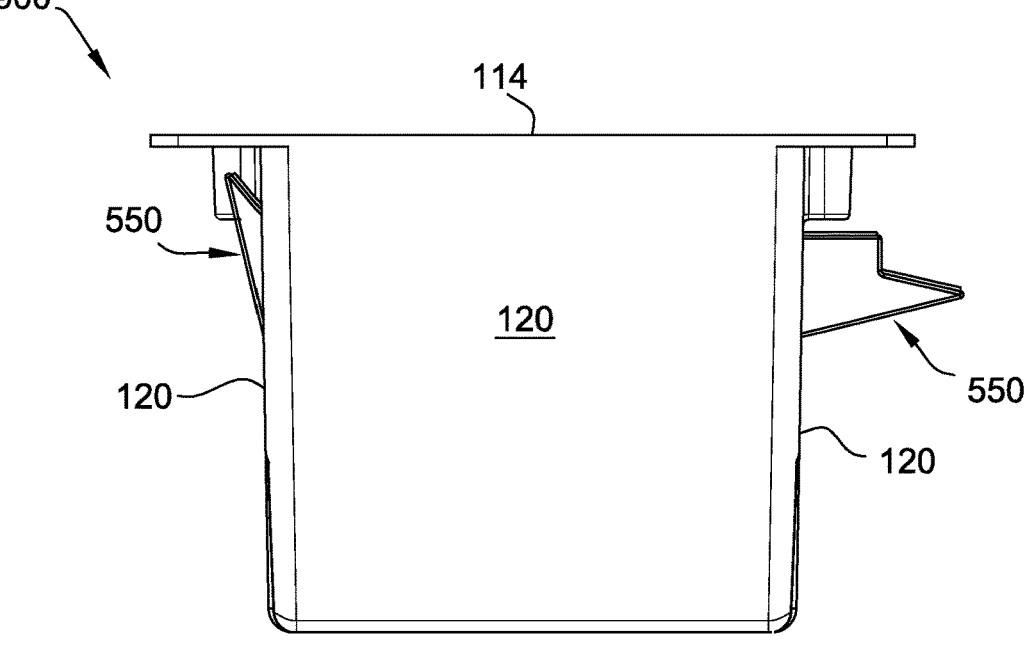
FIG. 9B illustrates a side view of the electrical box of FIG. 9A.
Figure 9C:
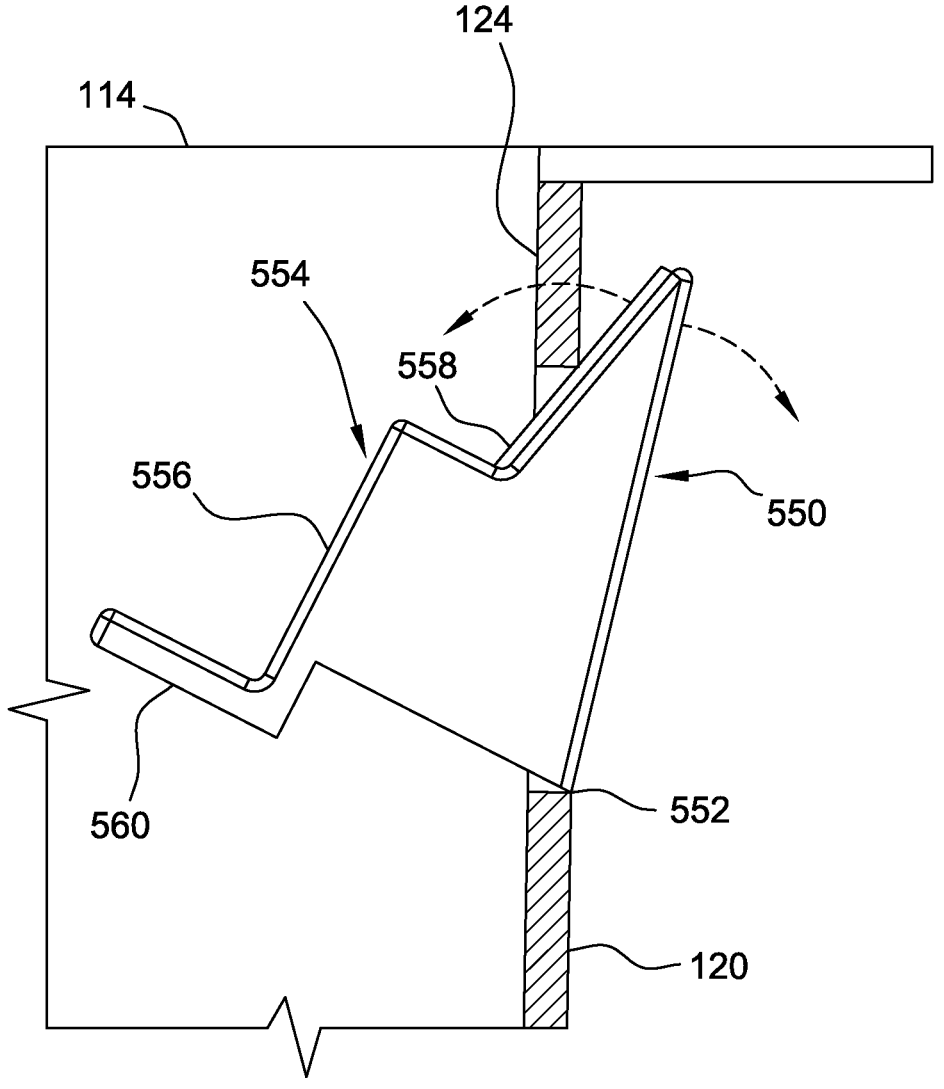
FIG. 9C illustrates a side view of a wall engagement member of the electrical box of FIG. 9A.
Figure 9D:
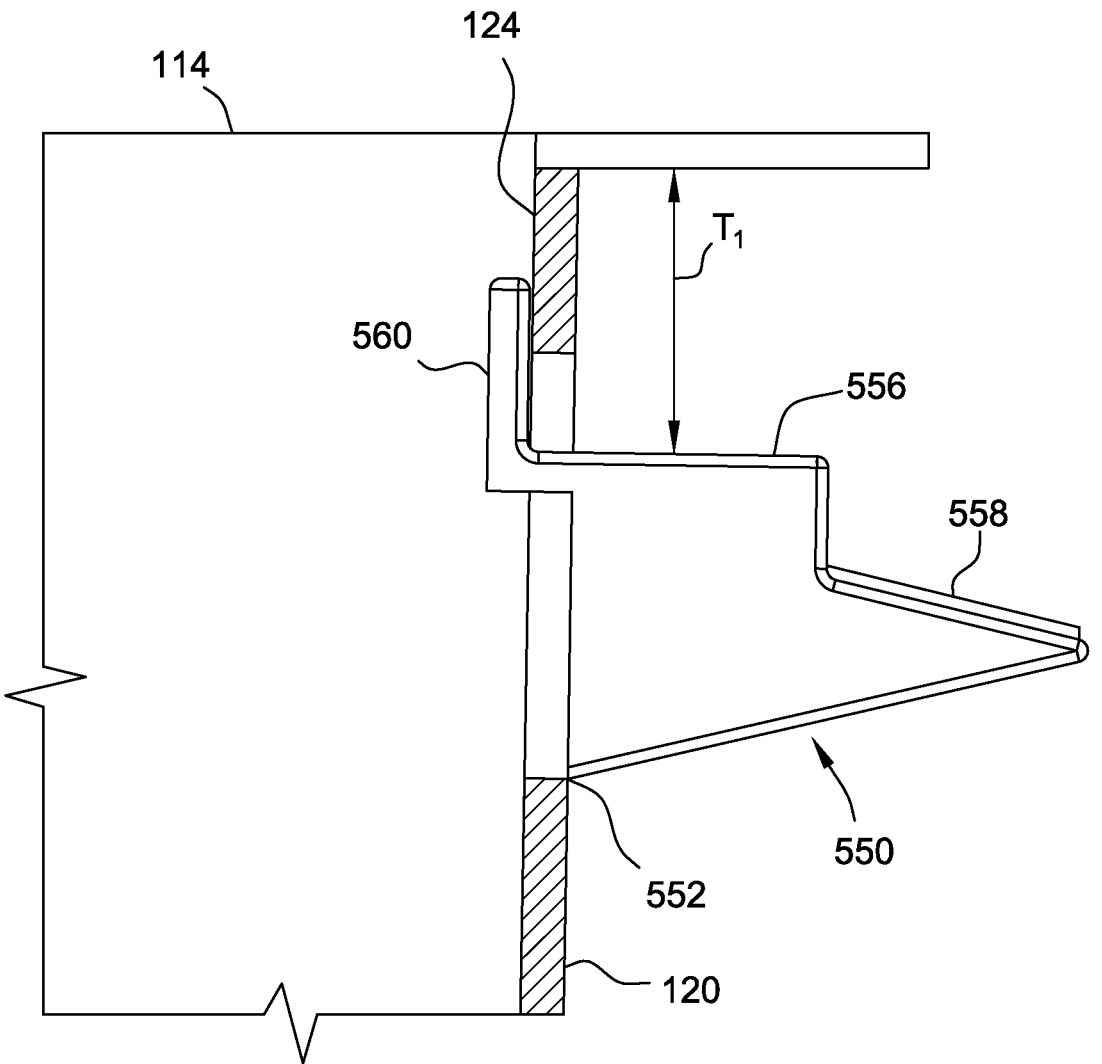
FIG. 9D illustrates a side view of a wall engagement member of the electrical box of FIG. 9A in a first position.
Figure 9E:
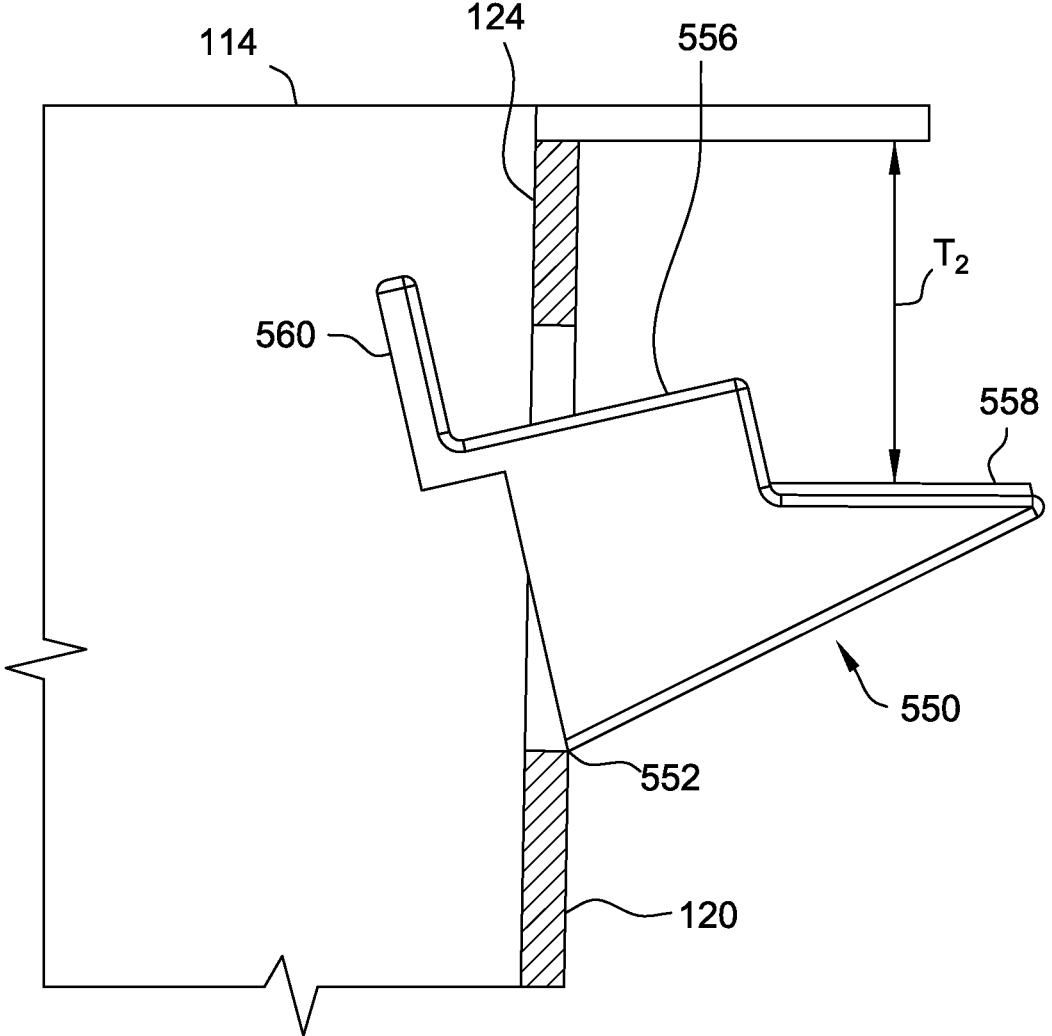
FIG. 9E illustrates a side view of a wall engagement member of the electrical box of FIG. 9A in a second position; and, FIG. 10 illustrates a perspective view of an electrical box in accordance with an embodiment of the present disclosure.
Figure 10:
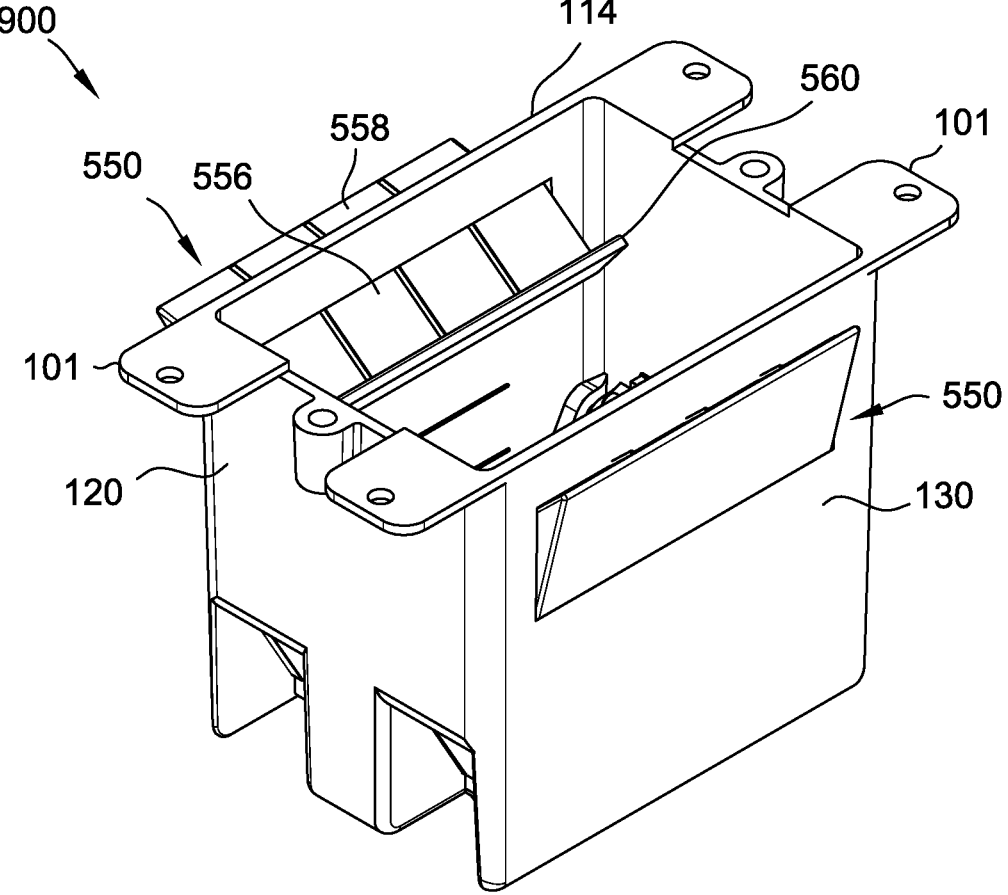

As best shown in FIG. 9C, the wall engagement member 550 includes a pivotable base 552 integral to the opposing first sidewall 120. The wall engagement member 550 further includes a surface profile 554 having a first ledge 556 and a second ledge 558. The wall engagement member 550 is rotatable about the pivotable base 552 between an extended position of FIG. 9D where tab 560 is in an extended orientation and a second retracted orientation of FIG. 9C where the second ledge 558 is proximate the exterior of sidewall 120. The stepped surface profile enables the member 550 to support wall members having a first thickness substantially equal to the distance between the first ledge 556 and tab 101, identified as $T_1$, or wall members having a second thickness substantially equal to the distance between second ledge 558 and tab 101, identified as $T_2$. The pivotable base 552 enables the wall engagement member to rotate the surface profile 554 within an opening 124 of the opposing first sidewalls 120. In some embodiments, the first thickness $T_1$ has a magnitude that is less than the magnitude of the second thickness $T_2$. In some embodiments, the first thickness $T_1$ is 0.375 inches (9.5 mm) and the second thickness $T_2$ is 0.5 inches (12.7 mm). FIG. 9D illustrates the wall engagement member 550 oriented such that the first ledge 556 supports a wall having the first thickness $T_1$ and FIG. 9E illustrates the wall engagement member 550 pivoted such that the second ledge 558 supports the wall having the second thickness $T_2$.

In some embodiments, the wall engagement member 550 includes a push tab 560. The push tab 560 may be contacted when the member 550 is located in compartment 102 as shown in FIG. 9E to urge the first wall engagement members 550 outward from opening 124 to the extended orientation such as the orientation of FIG. 9D.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical box comprising:
a housing comprising:
a closed end, opposing first sidewalls, and opposing second sidewalls, the opposing first sidewalls and the opposing second sidewalls extending from the closed end, wherein the housing includes an open end opposite the closed end;
lateral tabs extending from the housing at the open end, wherein the lateral tabs are integral with the housing;
at least one wall engagement member provided on each of the opposing first sidewalls, the at least one wall engagement member configured to engage an inner surface of a wall having an outer surface and a thickness upon insertion of the housing into an opening formed in the wall, wherein:
the lateral tabs contact the outer surface of the wall when the housing is inserted in the opening formed in the wall, and
the at least one wall engagement member is substantially integral with the respective opposing first sidewall; and
a second wall engagement member provided on each of the opposing first sidewalls, the second wall engagement member configured to engage an inner surface of a second wall having a second outer surface and a second thickness upon insertion of the housing into an opening formed in the wall, wherein the second thickness is greater than the first thickness.

2. The electrical box of claim 1, wherein each of the first engagement members comprises a first end, and each of the second engagement members comprises a second end, the first ends being located a first distance from the open end and the second ends being located a second distance from the open end, the first distance and second distance enabling the electrical box to be located along walls having different thicknesses.

3. The electrical box of claim 2, wherein each of the first engagement members includes a base and perforations along the base, the perforations enabling the first engagement members to be removably located along the first sidewalls.

4. The electrical box of claim 2, wherein the housing includes lateral tabs at the open housing end, and wherein the wall having a second thickness being located between the lateral tabs and the second ends of the second engagement members.

5. The electrical box of claim 2, wherein the housing comprises an open end opposite the closed end, and the first engagement member and the second engagement member each comprise a barb member, the barb members each having a base made integral with one of the opposing first sidewalls, and an end located away from the base proximate the open end.

6. The electrical box of claim 5, wherein the barbs are sized such that the barbs elastically deform upon partial insertion of the housing into an opening in the wall and elastically rebound and apply a biasing force against the inner surface of the wall having the first thickness upon full insertion of the housing into the opening.

7. The electrical box of claim 1, wherein at least one first engagement member and one second engagement member are fixed to each of the at least one of the opposing second sidewall.

8. The electrical box of claim 1 wherein the opposing second sidewalls of the housing are provided with at least one opening, and the at least one engagement member comprises a barb further comprising:
a pair of spaced ribs having a base pivotally joined to the opposing second sidewall adjacent the at least one opening; and
ends located away from the base, wherein the ends are joined by an end surface, the end surface and ribs joined by a bottom surface,
wherein the ribs, end surface, and bottom surface defining a hollow barb member interior, the at least one engagement member being movable into and out of the opening.

9. The electrical box of claim 8, wherein each of the opposing second sidewalls includes two barbs.

10. The electrical box of claim 9, wherein a planar barb member is located between the at least one engagement member.

11. The electrical box of claim 10, wherein the planar barb and hollow barbs are disposed on a movable panel provided along the opposing second sidewalls.

12. The electrical box of claim 11, wherein the panel is pivotally joined to each of the opposing second sidewalls.

13. The electrical box of claim 1, wherein each of the opposing first sidewalls include at least one opening, and wherein the at least one engagement member comprises a wedge-shaped barb, each wedge-shaped barb located adjacent to the at least one opening, each wedge-shaped barb being pivotally connected to the opposing first sidewall to be moved into and out of the at least one opening.

14. The electrical box of claim 1, wherein each of the first barb member and second barb member includes a flat surface, and wherein a first distance between the flat surface of the first barb member and the open end being less than a second distance between the flat surfaces of the second barb member and the open end.

15. The electrical box of claim 1, wherein the at least one engagement member comprises pivot tabs.

16. The electrical box of claim 15, wherein the housing comprises an open end opposite the closed end and lateral tabs proximate the open end, and wherein the pivot tabs comprise first pivot tabs and second pivot tabs, the first pivot tabs being located a first distance from the lateral tabs and the second pivot tabs being located a second distance from the lateral tabs, the second distance being greater than the first distance.

17. The electrical box of claim 1, wherein the at least one engagement member comprises an elongate pivot tab.

18. An electrical box comprising:

a housing comprising:

a closed end, an open end opposite the closed end, opposing first sidewalls, and opposing second sidewalls, the opposing first and second sidewalls extending from the closed end to define the open end;

lateral tabs extending from the housing at the open end, wherein the lateral tabs are integral with the housing;

at least one wall engagement member provided on each of the opposing second sidewalls, the at least one wall engagement member configured to engage an inner surface of a wall upon insertion of the housing into an opening formed in the wall, wherein a thickness of the wall at the opening is defined by a distance between the inner surface of the wall and an opposing outer surface of the wall, wherein:

the lateral tabs contact the outer surface when the housing is located in the opening in the wall, and the at least one wall engagement member is substantially integral with the respective opposing first sidewall; and a second wall engagement member provided on each of the opposing second sidewalls, the second wall engagement member configured to engage an inner surface of a second wall having a second outer surface and a second thickness upon insertion of the housing into an opening formed in the wall, wherein the second thickness is greater than the first thickness.

19. The electrical box of claim 18, wherein each of the opposing second sidewalls includes at least one opening, wherein each of the at least one engagement member comprises at least one of a first wedge-shaped barb and a second wedge-shaped barb, wherein each of the first wedge-shaped barb and the second wedge-shaped barb is located adjacent to the at least one opening, and wherein each of the first wedge-shaped barb and the second wedge-shaped barb are pivotally connected to the opposing second sidewall to be moved into and out of the at least one opening.

20. The electrical box of claim 19, wherein each of the first wedge-shaped barbs having a first flat contact surface located a first distance from the open end, wherein at least one of the first wedge-shaped barbs being located on the opposing second sidewall, wherein each of the second wedge-shaped barbs having a second flat contact surface located a second distance from the open end, at least one of the second wedge-shaped barbs being located on an opposing second sidewall, and wherein the first distance between the first flat contact surface and the open end being less than the second distance between the second flat contact surfaces and the open end.

21. The electrical box of claim 20, wherein the first and second sidewalls and closed end define a compartment, and wherein each of the at least one of a first wedge-shaped barbs and a second wedge-shaped barbs includes a flat contact surface and a tab made integral with the contact surface and located in the compartment.

22. The electrical box of claim 18, wherein the housing includes openings along the opposing second sidewalls, at least one engagement member comprises a barb having a stepped surface profile comprised of a first ledge and a second ledge, the barbs pivotally mounted to the housing along the second sidewalls to be movable into and out of the openings.

23. The electrical box of claim 20, wherein the barbs comprise elongate members.

24. The electrical box of claim 20, wherein the first and second sidewalls and closed end define a compartment, and wherein each of the barbs includes a tab made integral with the barb, the tab being located in the compartment when the barb is fixed along the second sidewall.

25. The electrical box of claim 20, wherein the housing includes openings along the first sidewalls, at least one engagement member comprises a barb having a stepped surface profile comprised of a first ledge and a second ledge, the barbs pivotally mounted to the housing along the first sidewalls to be movable into and out of the openings.

26. The electrical box of claim 25, wherein the first and second sidewalls and closed end define a compartment, and wherein each of the barbs includes a tab made integral with the barb, the tab being located in the compartment when the barb is fixed along the first sidewall.

* * * * *